United States Patent
Yamasaki et al.

(10) Patent No.: US 8,073,485 B2
(45) Date of Patent: Dec. 6, 2011

(54) WIRELESS COMMUNICATION DEVICE, WIRELESS COMMUNICATION PROGRAM STORAGE MEDIUM, AND WIRELESS COMMUNICATION METHOD

(75) Inventors: Miki Yamasaki, Fukuoka (JP);
Kazuhisa Obuchi, Kawasaki (JP);
Masaaki Suzuki, Kawasaki (JP);
Akihide Otonari, Fukuoka (JP);
Yoshinori Soejima, Fukuoka (JP);
Chiaki Shinohara, Fukuoka (JP);
Shinya Okamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 12/343,502

(22) Filed: Dec. 24, 2008

(65) Prior Publication Data
US 2009/0170556 A1    Jul. 2, 2009

(30) Foreign Application Priority Data
Dec. 27, 2007 (JP) .................. 2007-337317

(51) Int. Cl.
*H04M 1/00* (2006.01)
(52) U.S. Cl. ..................... 455/552.1; 370/329

(58) Field of Classification Search ............. 455/552.1, 455/69, 522, 67.11, 68, 510, 422.1, 436, 455/435.5, 445, 453; 370/329, 335, 206, 370/236
See application file for complete search history.

(56) References Cited

U.S. PATENT DOCUMENTS

| | | | |
|---|---|---|---|
| 6,754,189 B1 * | 6/2004 | Cloutier et al. | ............... 370/329 |
| 7,593,328 B2 | 9/2009 | Yang et al. | |
| 2007/0140123 A1 | 6/2007 | Fukui | |

FOREIGN PATENT DOCUMENTS

| | | |
|---|---|---|
| JP | 2004-297381 | 10/2004 |
| WO | WO 2005/088917 A1 | 9/2005 |

OTHER PUBLICATIONS

"Extended European Search Report" mailed by EPO and corresponding to European application No. 08165568.0 on Mar. 24, 2011.
"3rd Generation Partnership Project" (3GPP TS 43.051 v5.1.0 (Apr. 2001)), Technical Specification Group GSM/EDGE Radio Access Network; Overall Description—Stage 2; (Release 5); Apr. 19, 2001.
"Universal Mobile Telecommunications System (UMTS)", 3G Security; Security architecture (3GPP TS 33.102 version 7.1.0 Release 7); Dec. 1, 2006.
"3Gpp TS 36.300 V8.2.0",http://3gpp.org/ftp/Specs/archive/36_series/36.300/36300-820.zip.

* cited by examiner

*Primary Examiner* — Joseph Lauture
(74) *Attorney, Agent, or Firm* — Fujitsu Patent Center

(57) ABSTRACT

An amount of data accumulated in a data-receiving buffer is monitored. When the accumulated amount of data exceeds a threshold, a control PDU indicating that the accumulated amount of data exceeds the threshold is generated and transmitted to a data transmitter.

10 Claims, 10 Drawing Sheets

WIRELESS COMMUNICATION DEVICE, WIRELESS COMMUNICATION PROGRAM STORAGE MEDIUM, AND WIRELESS COMMUNICATION METHOD

CROSS-REFERENCE TO RELATED APPLICATIONS

This application is related to and claims priority to Japanese Patent Application No. 2007-337317 filed on Dec. 27, 2007 in the Japan Patent Office, and incorporated by reference herein.

BACKGROUND

1. Field

The present invention relates to a wireless communication device, a wireless communication program storage medium, and a wireless communication method.

2. Description of the Related Art

In recent years, a protocol of a wireless communication system called 3G (third generation) is widely employed.

The 3G has some developmental stages. In addition to a cellular phone employing the original 3G, a cellular phone employing 3.5G with a further higher communication speed or a protocol called HSDPA has entered the field. Furthermore, Super 3G or 3.9, or a protocol called LTE (Long Term Evolution) is currently under review.

FIG. 1 is a schematic diagram of a wireless communication system employing the LTE protocol.

A terminal (UE; User Equipment) 10 wirelessly communicates with a base station (eNB; evolved Node B) 20 in accordance with the LTE protocol. The base stations (eNB) 20 are connected to an IP network 40 through an access gateway (aGW) 30 that intermediates a flow of data between the base stations (eNB) 20 and the IP network 40. Although only one aGW 30 is illustrated in FIG. 1, a large number of aGWs are connected to the IP network 40, and one or multiple eNBs exist under each aGW. Although only one UE 10 is illustrated in FIG. 1, a large number of UEs exist, and the UEs can intercommunicate through the eNB, the aGW, and the IP network 40.

FIG. 2 illustrates a protocol diagram of the LTE protocol.

The protocol in the wireless communication system of the 3G group is divided into multiple layers. Similarly, the LTE protocol is also divided into multiple layers.

A layer 1 is a layer called a physical layer, and the layer 1 is a portion that performs the actual communication.

A layer 2 located on the upper side of the layer 1 has three sublayers including a MAC (Medium Access Control) sublayer, an RLC (Radio Link Control) sublayer, and a PDCP (Packet Data Convergence Protocol).

A block of processing functions arranged in a layer or a sublayer is called an entity. PDCP entities and RLC entities exist by the number of logical channels used in accordance with each logical channel (LCH; Logical Channel) and transmit and receive a PDU (Protocol Data Unit). In case of the LTE protocol, a data concealment process and a data interface process with a further upper layer (not shown) are executed in a PDCP entity. In an RLC entity, a data conversion process is executed, and also, a retransmission process that requests a retransmission of insufficient data is executed.

A MAC entity integrates the PDUs transmitted from the RLC entities into one PDU and forwards the PDU to the layer 1. In the receiver side, the MAC entity divides the PDU transmitted from the layer 1 into PDUs of respective logical channels and transmits the divided PDUs to the RLC entities of corresponding logical channels.

FIG. 3 is a wireless communication system diagram in the LTE protocol.

The layer 1 is omitted, and only the layer 2 is covered herein. Furthermore, only one logical channel is illustrated herein.

When transmitting data from the eNB side to the UE side, the data transmitted from the upper layer is temporarily accumulated in a buffer 213a of a PDCP entity 213 on the eNB side. The data is subjected to processes such as a concealment process and handed over to an RLC entity 212. In the RLC entity 212, the data transmitted from the PDCP entity 213 is temporarily accumulated in a buffer 212a. The data is subjected to either a data conversion process or a retransmission process and then transmitted to a MAC entity 211. In the MAC entity 211 too, the data transmitted from the RLC entity 212 is temporarily accumulated in a buffer 211a. The data of multiple logical channels is integrated and transmitted to the UE side through the physical layer not shown.

In the UE side, the data received through the physical layer is temporarily accumulated in a buffer 121a of a MAC sublayer 121. The data is divided into pieces of data each of which is for each logical channel and transmitted to an RLC sublayer 122 of a corresponding logical channel. In the RLC sublayer 122, the piece of data transmitted from the MAC sublayer 121 is temporarily accumulated in a buffer 122a. The data is subjected to a data conversion process or a retransmission process and transmitted to the PDCP entity 123. In the PDCP entity 123, the data received from the RLC entity 122 is temporarily accumulated in a buffer 123a. The data is subjected to a concealment releasing process and the like and further transmitted to the upper layer of the UE side.

Data is similarly transmitted from the UE side to the eNB side. In the UE side, the data received from the upper side is temporarily accumulated in the buffer 123a of the PDCP entity 123 and then transmitted to the RLC entity 122. In the RLC entity 122, the data transmitted from the PDCP entity 123 is temporarily accumulated in a buffer 122b and then transmitted to the MAC entity 121. In the MAC entity 121 too, the transmitted data is temporarily accumulated in a buffer 121b and then transmitted to the eNB side through the physical layer.

In the eNB side, the data received through the physical layer is temporarily accumulated in a buffer 211b of the MAC entity 211 and then transmitted to the RLC entity 212. In the RLC entity 212, the received data is temporarily accumulated in a buffer 212b and then transmitted to the PDCP entity 213. In the PDCP entity 213, the data received from the RLC entity 212 is temporarily accumulated in a buffer 213b and then transmitted to the upper layer of the eNB side.

Japanese Patent Application Publication No. 2004-297381 discusses a technique that switches the wireless communication network of the data destination when the buffer of a router is about to overflow in a case where multiple wireless communication networks are connected through the router for data transmission.

FIG. 4 is a wireless communication system diagram for describing a problem.

FIG. 4 is only different from FIG. 3 in that an application 100 is added. Overlapping descriptions of the items described in FIG. 3 will be omitted.

The application 100 may be, for example, an application program downloaded through wireless communication and executed in the UE, or may be an application program executed in another device such as a personal computer (PC) or the like when the UE is further connected to such a device.

If the application 100 is an application with a low throughput, i.e., if the application 100 receives data at a low speed, the data transmitted from the eNB side is not quickly transmitted to the application 100. In this case, a large amount of data may be accumulated in the buffers 123a and 122a, and the data may overflow from the buffers 123a and 122a, causing missing of data.

As the communication speed between the eNB side and the UE side becomes faster, the application 100 that is developed without taking into account such a high communication speed may not be able to deal with the speed.

SUMMARY

The present invention has been made in view of the above circumstances and provides a wireless communication device in which missing of data is suppressed, a wireless communication program storage medium therefore, and a wireless communication method.

A wireless communication device according to the present invention includes:

a wireless communication section that wirelessly communicates with another wireless communication device;

a first data processing section that obtains data received in the wireless communication section from the another wireless communication device, separates the data into pieces of the data for respective logical channels, and distributes the pieces of data to the logical channels respectively; and a plurality of second data processing sections that are assigned to the logical channels respectively, receive the pieces of data for the logical channels from the first data processing section, and process the received pieces of data, each of the plurality of second data processing sections further comprising:

a buffer that temporarily accumulates data to which the second data processing section applies a process;

a buffer monitoring section that monitors an amount of data accumulated in the buffer and detects that the amount of data is exceeded a predetermined threshold; and a control information generating section that generates, in response to detecting in the buffer monitoring, data-amount control information for instructing a reduction in a data transmission rate of the corresponding logical channel, and transmits the generated data-amount control information toward the another wireless communication device through the wireless communication section.

The wireless communication device of the present invention monitors the accumulated amount of data accumulated in the buffer and instructs to reduce the data transmission rate toward another wireless communication device when the amount of data exceeding the predetermined threshold is accumulated in the buffer. Therefore, by lowering the data transmission rate in the another wireless communication device in accordance with the instruction, it is possible to reduce an amount of data that is lost at a receiving wireless communication device when the data cannot be processed therein.

In the wireless communication device according to the present invention, each of the plurality of second data processing sections may include:

a first sub-processing section that obtains encrypted piece of data for the logical channel from the first data processing section when the received data is encrypted and requests retransmission of a lack of pieces of data; and a second sub-processing section that obtains the encrypted data from the first sub-processing section and decodes the encrypted piece of data, wherein the buffer, the buffer monitoring section, and the control information generating section are arranged in the second sub-processing section.

In this case, alternatively, the buffer and the buffer monitoring section may arranged in the second sub-processing section while the control information generating section is arranged in the first sub-processing section. Alternatively, all of the buffer, the buffer monitoring section, and the control information generating section may be arranged in the first sub-processing section.

In the LTE protocol, the wireless communication section is arranged on the physical layer. The first data processing section is placed on a MAC (Medium Access Control) sublayer. The first sub-processing section and the second sub-processing section of the second data processing section are arranged on an RLC (Radio Link Control) sublayer and a PDCP (Packet Data Convergence Protocol) sublayer, respectively.

Alternatively, in the wireless communication device according to an aspect of an embodiment, instead of each of the plurality of second data processing sections including the control data generating section, the first data processing section may include a control information generating section that generates, in response to the buffer amount monitoring section included in each of the plurality of second data processing sections detecting that the amount of data accumulated in the buffer included in the second data processing section has exceeded the predetermined threshold, data-amount control information for instructing a reduction in the data transmission rate of the logical channel, and transmits the generated data-amount control information toward the another wireless communication device through the wireless communication section.

In this way, the data control information may be generated in the first data processing section (Mac sublayer in the LTE protocol).

Further, a wireless communication program storage medium according to the present invention is a storage medium which stores a wireless communication program that causes a computer to function as a wireless communication device that is wirelessly connectable to a network, the program including the steps of:

communicating wirelessly with another wireless communication device;

obtaining data received from the another wireless communication device, separating the obtained data into pieces of data for respective logical channels, and distributing the pieces of data to the logical channels, respectively; and processing the distributed pieces of data and including, for each of the logical channels, the steps of:

temporarily accumulating the piece of data to be processed for each of the logical channels;

monitoring the buffer to detect that an amount of the piece of data accumulated in the buffer exceeds a predetermined threshold; and generating, in response to detecting in the step of monitoring the buffer, data-amount control information for instructing a reduction in a data transmission rate of the corresponding logical channel and transmitting the generated data-amount control information toward the another wireless communication device through wireless communication.

Furthermore, a wireless communication method according to the present invention is a wireless communication method for causing a wireless communication device connectable to a network to perform wireless communication via a base station, the wireless communication method including the steps of:

communicating wirelessly with another wireless communication device;

obtaining data received from the another wireless communication device, separating the obtained data into pieces of data for respective logical channels, and distributing the pieces of data to the logical channels, respectively; and processing the distributed pieces of data and including, for each of the logical channels, the steps of:

temporarily accumulating the piece of data to be processed for each of the logical channels;

monitoring the buffer to detect that an amount of the piece of data accumulated in the buffer exceeds a predetermined threshold; and generating, in response to detecting in the step of monitoring the buffer, data-amount control information for instructing a reduction in a data transmission rate of the corresponding logical channel and transmitting the generated data-amount control information toward the another wireless communication device through wireless communication.

DETAILED DESCRIPTION OF THE INVENTION

Embodiments of the present invention will now be described.

Figure 5:
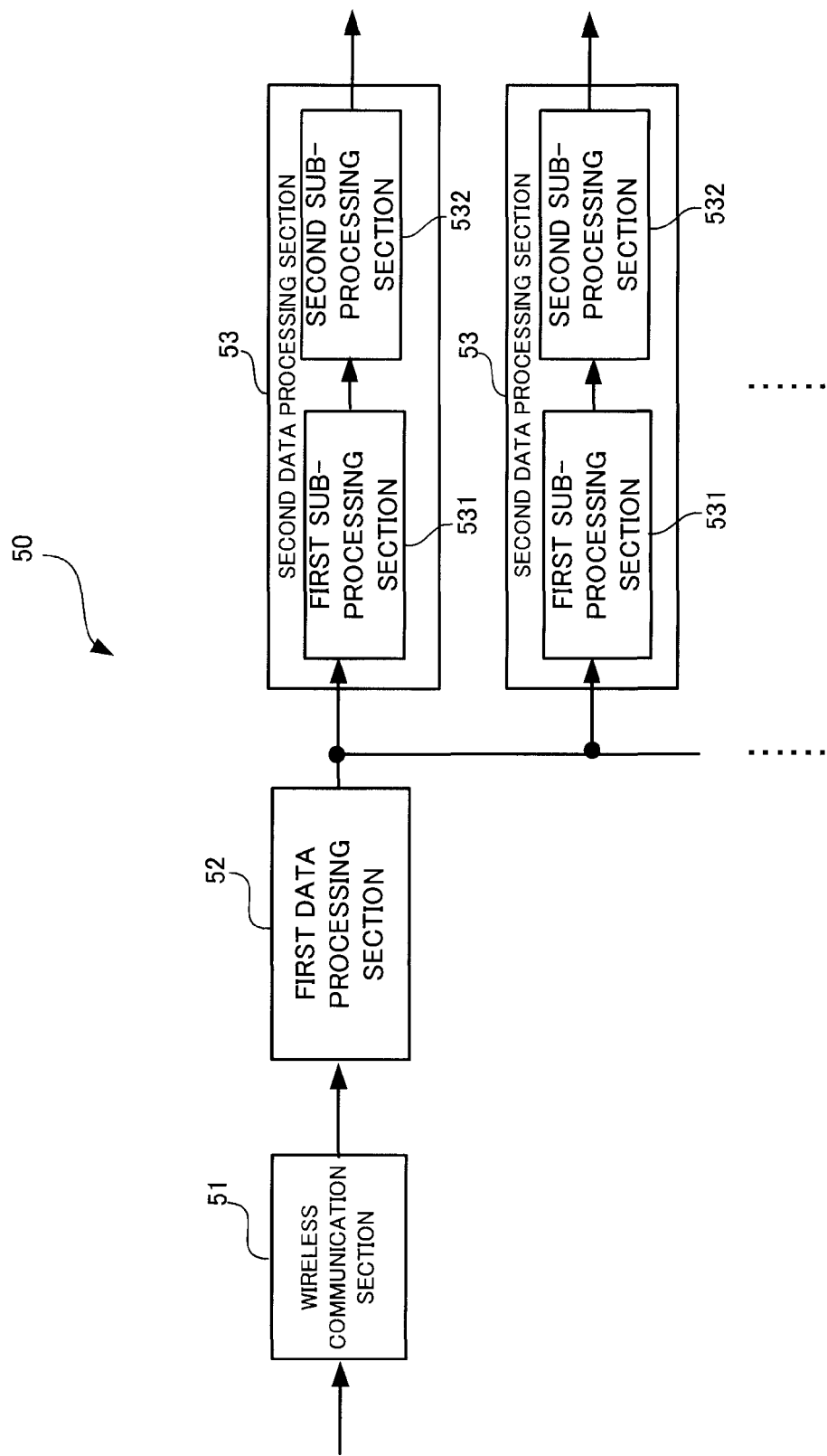
FIG. 5 is a block diagram showing a summary of a wireless communication device as an embodiment of the present invention.

FIG. 5 is a block diagram showing a summary of a wireless communication device as an embodiment of the present invention.

A wireless communication device 50 includes a wireless communication section 51, a first data processing section 52, and second data processing sections 53. Each of the second data processing sections 53 includes a first sub-processing section 531 and a second sub-processing section 532.

The wireless communication section 51 is an element that wirelessly communicates with other wireless communication devices. An entity arranged on a physical layer is equivalent to the wireless communication section 51 in the LTE protocol.

The first data processing section 52 is an element that obtains data received by the wireless communication section 51 and that separates the data into pieces of the data for each logical channel for distribution to multiple logical channels. The MAC entity arranged on the MAC sublayer of the layer 2 is equivalent to the first data processing section 52 in the LTE protocol.

The second data processing section 53 is an element that is arranged in each of the multiple logical channels and that obtains and processes the pieces of the data of the logical channel from the first data processing section 52. The first sub-processing section 531 including the second data processing section 53 is an element that executes a retransmission process for requesting retransmission of lacks of the pieces of the data and other data conversion processes. An RLC entity arranged on an RLC sublayer of the layer 2 is equivalent to the first sub-processing section 531 in the LTE protocol. The second sub-processing section 532 including the second data processing section 53 is an element that executes a concealment process such as encrypted data decoding and an interface process with a further upper layer. A PDCP entity arranged on a PDCP sublayer of the layer 2 is equivalent to the second sub-processing section 532 in the LTE protocol.

Figure 6:
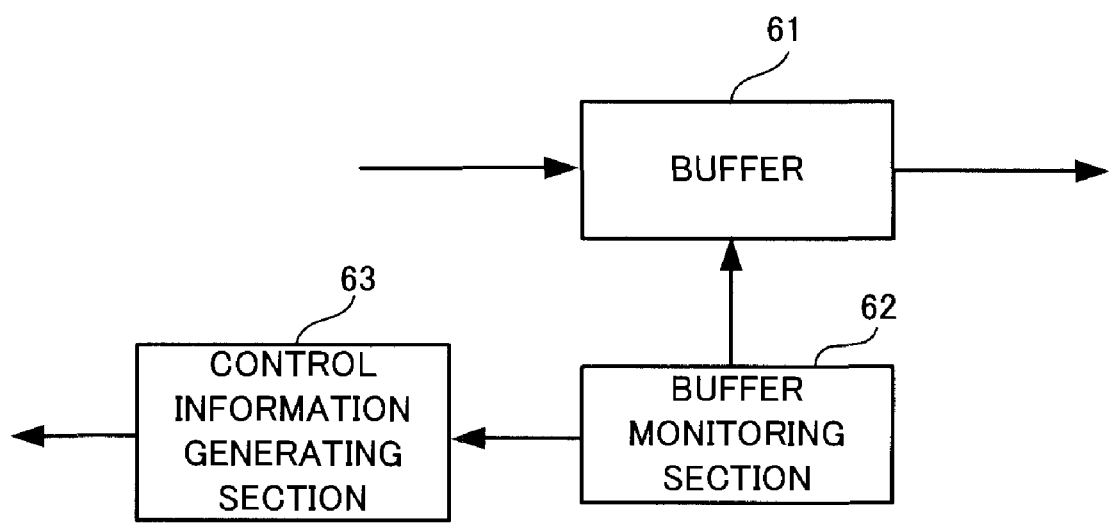
FIG. 6 is a block diagram showing elements distinctive in the present embodiment among the elements of a second data processing section.

FIG. 6 is a block diagram showing elements distinctive in the present embodiment among the elements of the second data processing section.

FIG. 6 illustrates a buffer 61, a buffer monitoring section 62, and a control information generating section 63.

The buffer 61 is an element that temporarily accumulates an amount of data of the logical channel handled by the second data processing section 53 (see FIG. 5) on which the buffer 61 is arranged. The buffer monitoring section 62 is an element that detects if the amount of data temporarily accumulated in the buffer 61 has exceeded a predetermined threshold. If the data smoothly flows to the upper side, the amount of data accumulated in the buffer 61 is at a level below the threshold. The accumulated amount of data may exceed the threshold when the flow of data to the upper side is disrupted.

The control information generating section 63 is an element that generates data-amount control information for instructing to lower the data transmission rate of the logical channel when it is detected by the buffer monitoring section 62 that monitors the amount of data accumulated in the buffer 61 and the amount of data has exceeded the threshold. The control information generating section 63 then transmits the generated data-amount control information toward another wireless communication device in the data transmitting side through the wireless communication section 51 (see FIG. 5).

All of the buffer 61, the buffer monitoring section 62, and the control information generating section 63 may be arranged in the second sub-processing section 532 of the second data processing section 53 (see FIG. 5), or the buffer 61 and the buffer monitoring section 62 may be arranged in the second sub-processing section 532 while the control information generating section 63 is arranged on the first sub-processing section 531. Alternatively, all of the buffer 61, the buffer monitoring section 62, and the control information generating section 63 may be arranged in the first sub-processing section 531.

As will be described below, the control information generating section may also be arranged in the first data processing section 52, instead of in the second data processing section 53.

Figure 7:
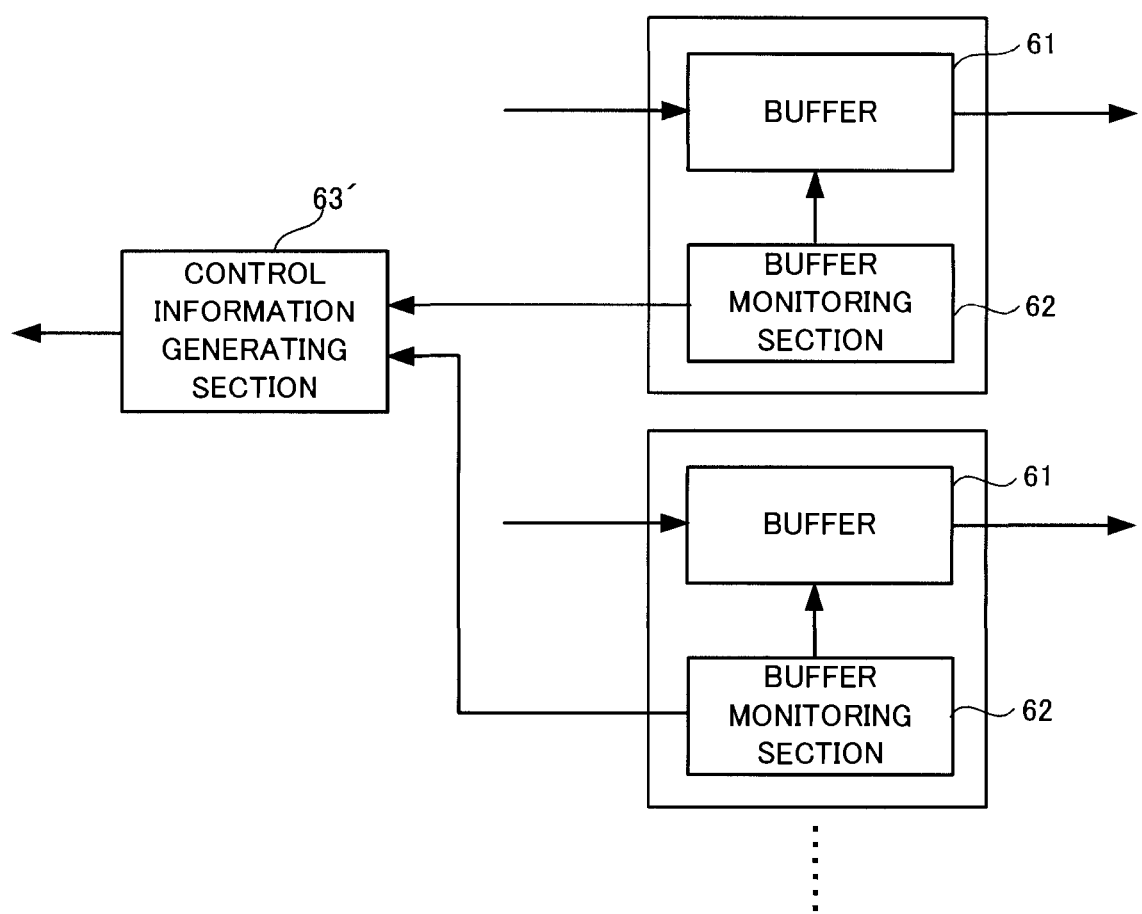
FIG. 7 is a block diagram showing elements distinctive in the present embodiment when a control information generating section is arranged in a first data processing section.

FIG. 7 is a block diagram showing elements distinctive in the present embodiment in which a control information generating section is arranged in the first data processing section.

The buffer 61 and the buffer monitoring section 62 are arranged on the second data processing section 53 (see FIG.

5) arranged in each logical channel, and a control information generating section 63' is arranged in the first data processing section 52 (see FIG. 5). In this case, the control information generating section 63' receives, from each of the buffer monitoring sections 62 in all logical channels, a detection result indicating that the amount of data accumulated in the buffer 61 on the logical channel has exceeded the threshold. The control information generating section 63' then generates data-amount control information for instructing to lower the data transmission rate of the logical channel in which the accumulated amount of data has exceeded the threshold, and transmits the information toward the another wireless communication device in the data transmitting side.

Even when the control information generating section 63' is arranged in the first data processing section 52 (see FIG. 5) as shown in FIG. 7, the buffer 61 and the buffer monitoring section 62 may be arranged in the first sub-processing section 531 of the second data processing section 53 or may be arranged in the second sub-processing section 532.

Embodiments of the present invention will be specifically described on the basis of the LTE protocol.

Figure 8:
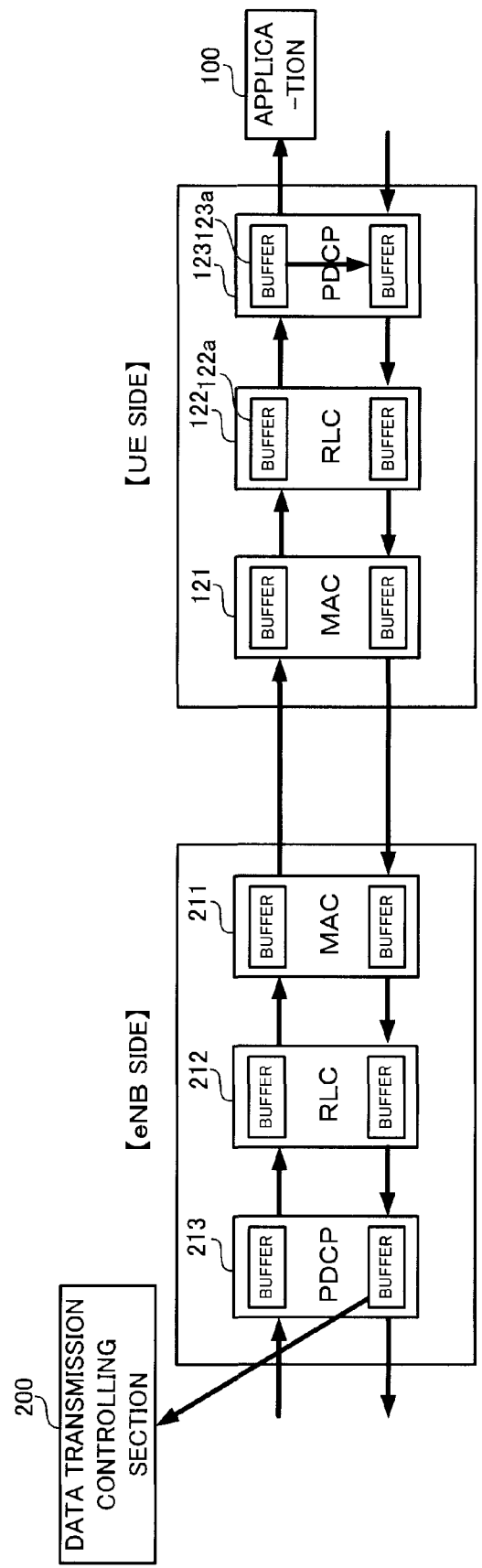
FIG. 8 is a wireless communication system diagram of a first embodiment among the specific embodiments of the present invention.

FIG. 8 is a wireless communication system diagram of a first embodiment among the specific embodiments of the present invention.

Figure 3:
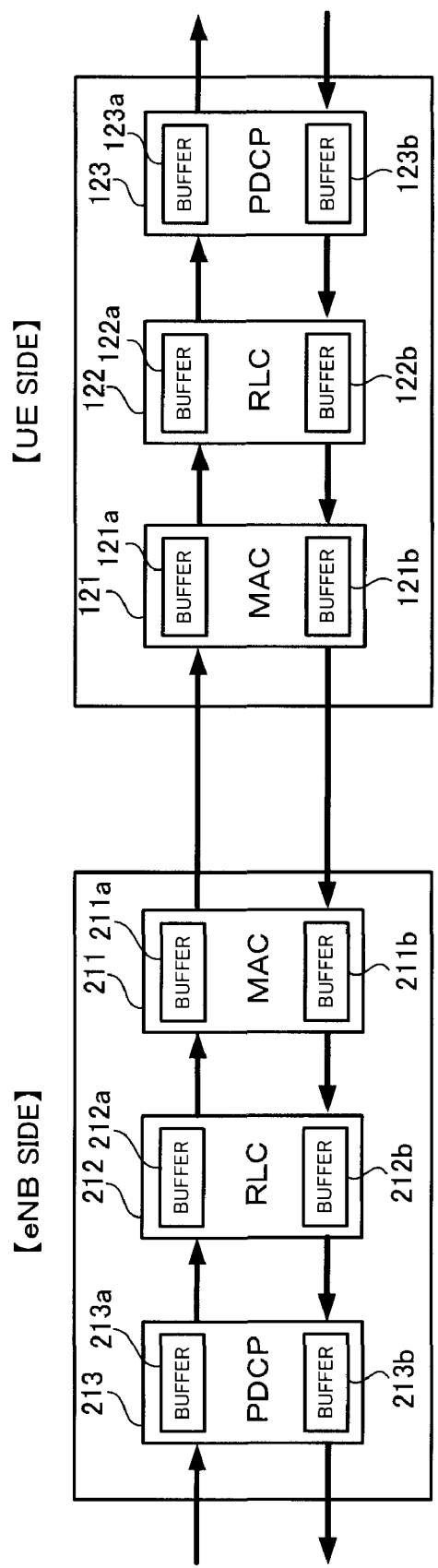
FIG. 3 is a wireless communication system diagram in the LTE protocol.
Figure 4:
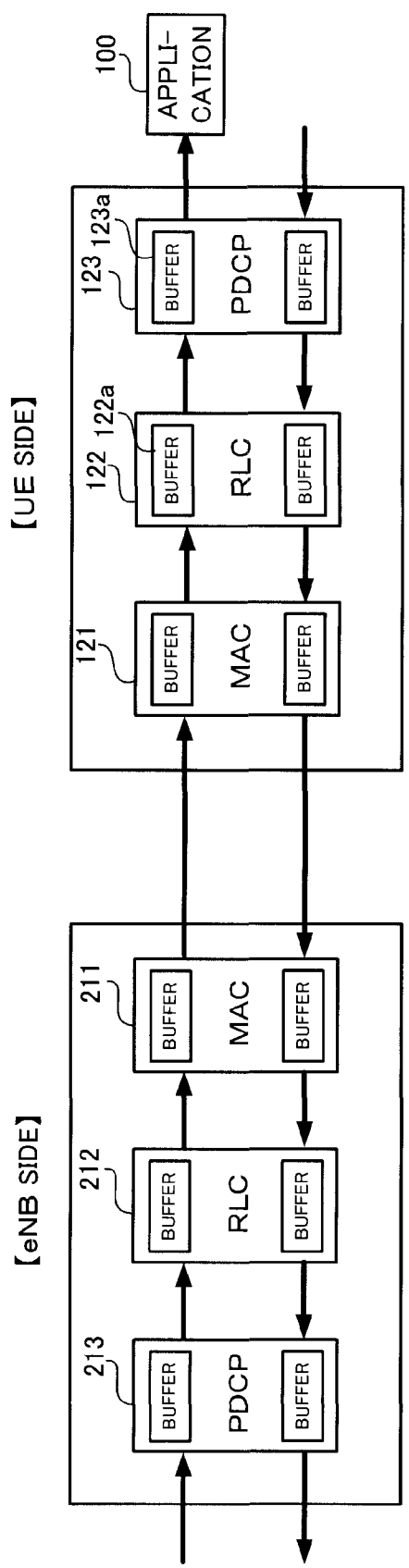
FIG. 4 is a wireless communication system diagram for describing a problem.

Only the features different from FIGS. 3 and 4 will be described.

A threshold is set in a buffer 123a in a PDCP entity 123 on the UE side, and a buffer monitoring section monitors the amount of data accumulated in the buffer 123a. Once the buffer monitoring section detects that the data is accumulated in the buffer 123a exceeding the threshold, a control PDU indicating that the amount of data has exceeded the threshold is generated in the PDCP entity 123, and the control PDU is transmitted to the opposing eNB side through the RLC entity 122, the MAC entity 121, and a physical layer not shown.

Figure 1:
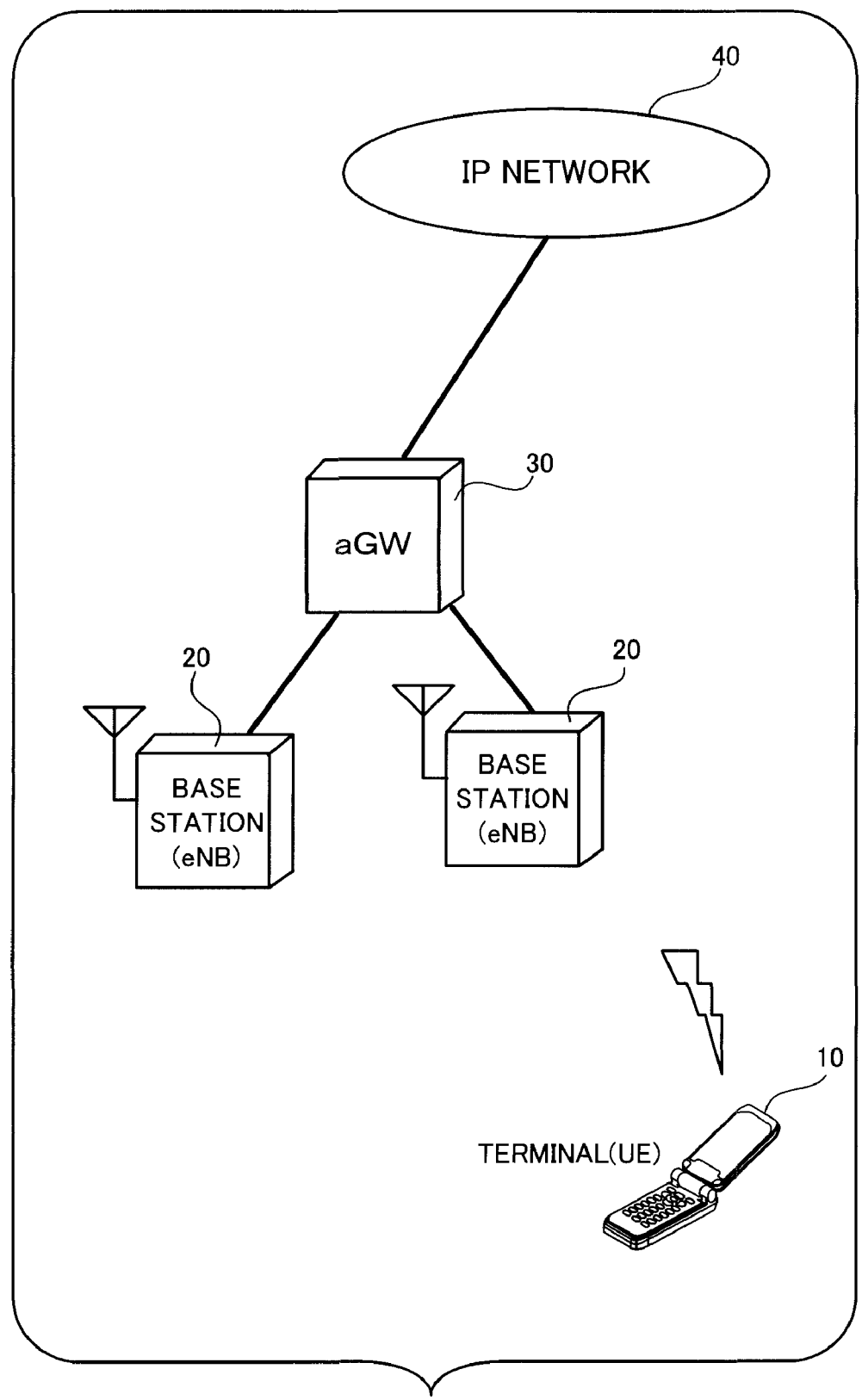
FIG. 1 is a schematic diagram of a wireless communication system when an LTE protocol is employed.
Figure 2:
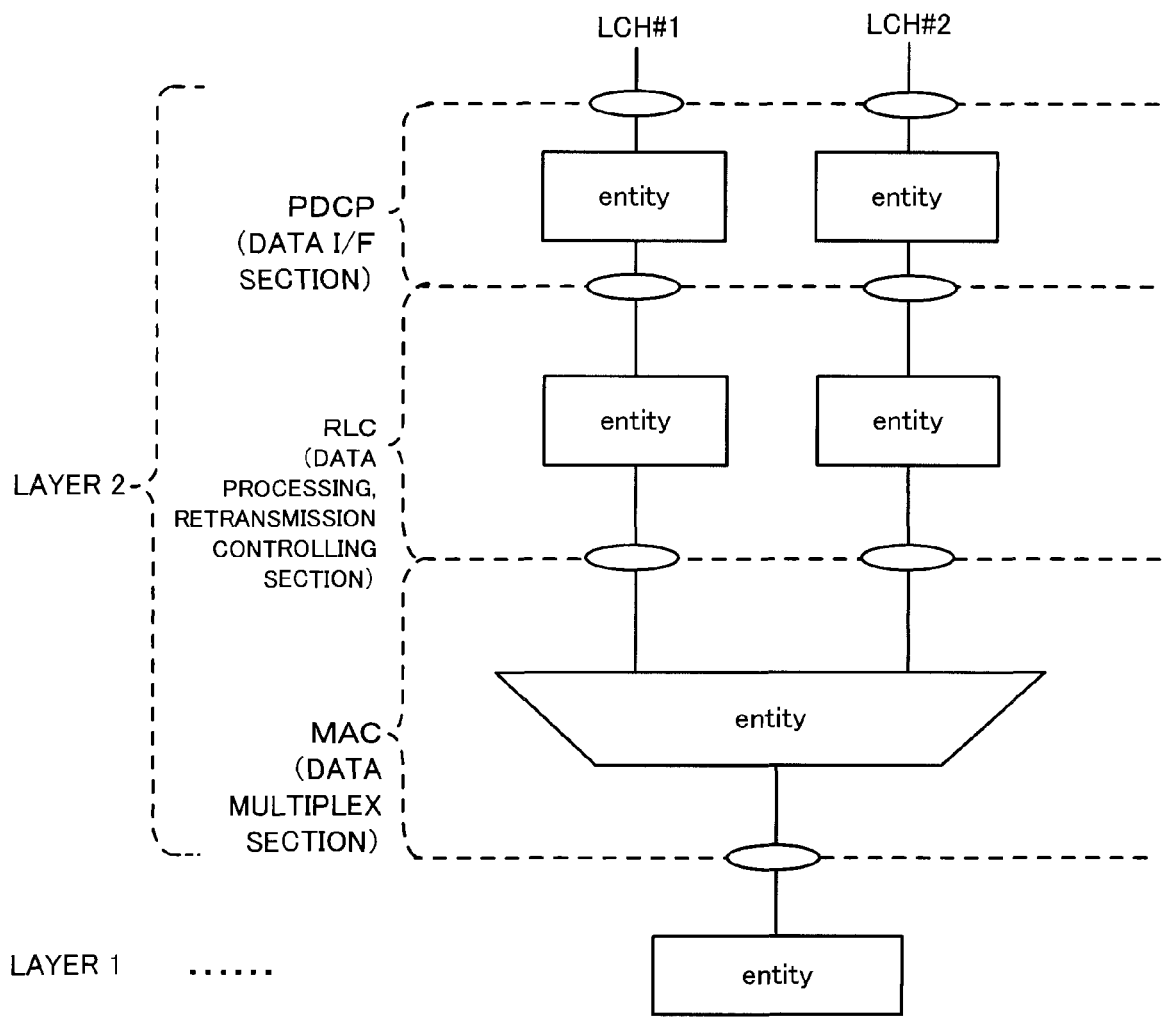
FIG. 2 is a protocol diagram of the LTE protocol.

After receiving the control PDU indicating that the amount of data has exceeded the threshold, a PDCP entity 213 on the eNB side informs an upper data transmission controlling section 200 that the amount of data has exceeded the threshold. The data transmission controlling section 200 adjusts the amount of data received from an IP network 40 (see FIG. 1).

As a result, the transmission rate of the data transmitted from the eNB side to the UE side is reduced, so that it is possible to prevent data from overflowing the buffer 123a and disappearing.

Figure 9:
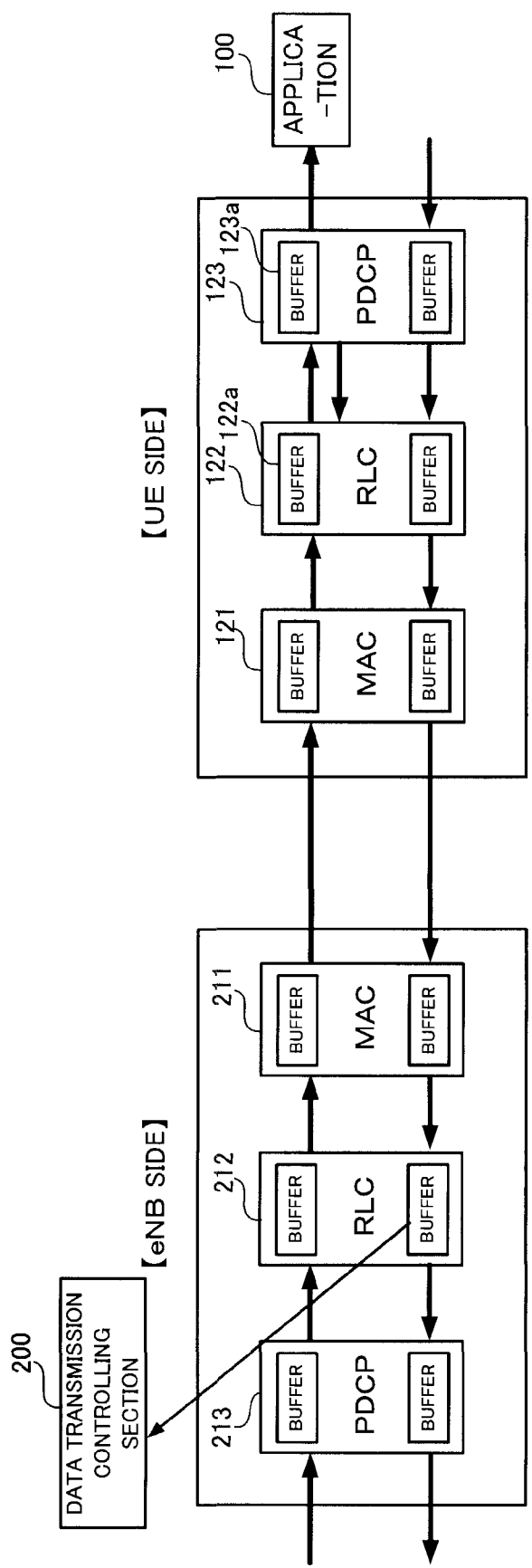
FIG. 9 is a wireless communication system diagram of a second embodiment among the specific embodiments of the present invention.

FIG. 9 is a wireless communication system diagram of a second embodiment among the specific embodiments of the present invention. Only the features different from FIGS. 3 and 4 will be described herein.

A threshold is set in the data buffer 123a in the PDCP entity 123 on the UE side, and the buffer monitoring section monitors the amount of data accumulated in the buffer 123a. Once the buffer monitoring section detects that the amount of the data is accumulated in the buffer 123a exceeding the threshold, the detection result is informed to the RLC entity 122. A control PDU indicating that the amount of data has exceeded the threshold is generated in the RLC entity 122, and the control PDU is transmitted to the opposing eNB side through the MAC entity 121 and the physical layer not shown.

Upon receipt of the control PDU indicating that the amount of data has exceeded the threshold, the RLC entity 212 on the eNB side informs that effect to the upper data transmission controlling section 200. The data transmission controlling section 200 adjusts the amount of data received from the IP network 40 (see FIG. 1). In this case, an accumulation size informed from the RLC entity 212 on the eNB side to the MAC entity 211 is set small.

As a result, the transmission rate of the data transmitted from the eNB side to the UE side is reduced, and it is possible to prevent data from overflowing the buffer 123a and disappearing.

Figure 10:
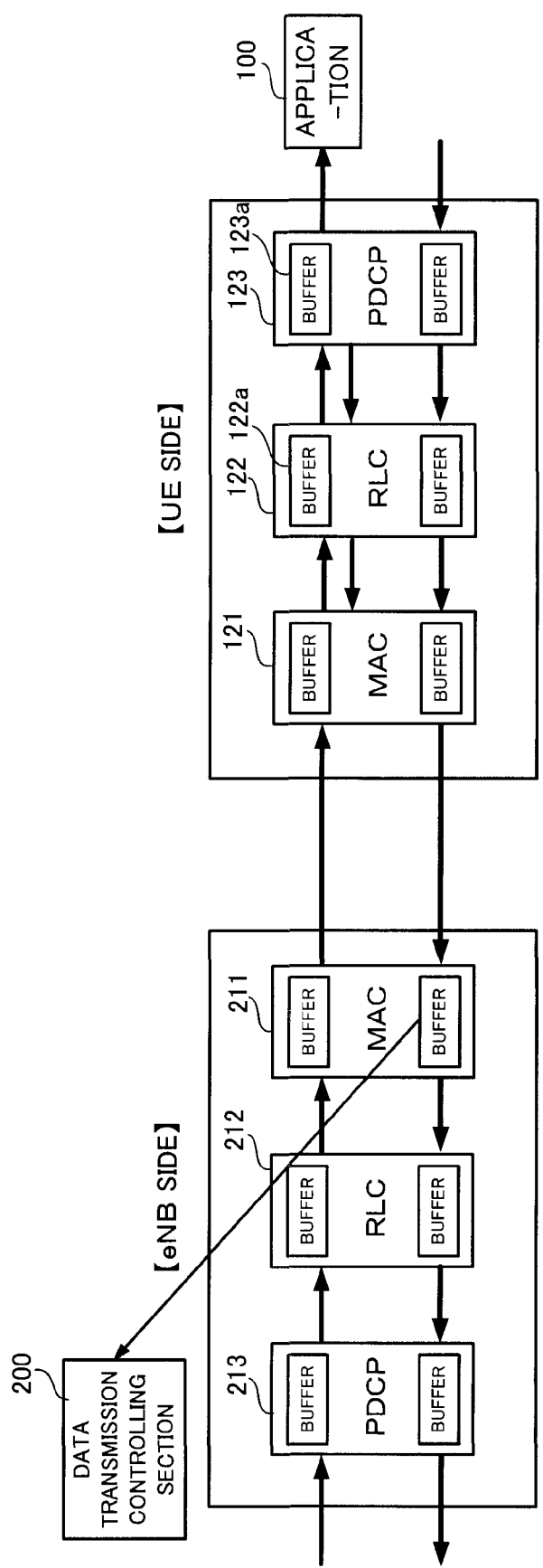
FIG. 10 is a wireless communication system diagram of a third embodiment among the specific embodiments of the present invention.

FIG. 10 is a wireless communication system diagram of a third embodiment among the specific embodiments of the present invention. Only the features different from FIGS. 3 and 4 will be described herein too.

A threshold is set to the data buffer 123a in the PDCP entity 123 on the UE side, and the buffer monitoring section monitors the amount of data accumulated in the buffer 123a. Once the buffer monitoring section detects that the data is accumulated in the buffer 123a exceeding the threshold, the detection result is informed to the MAC entity 121 through the RLC entity 122. In the MAC entity 121, a control PDU which indicates that the amount of data has exceeded the threshold is generated in the logical channel that has received the notification, and the control PDU is transmitted to the opposing eNB side through the RLC entity 122, the MAC entity 121, and the physical layer not shown.

Upon receipt of the control PDU indicating that the amount of data has exceeded the threshold, the MAC entity 211 on the eNB side informs that effect to the upper data transmission controlling section 200. The data transmission controlling section 200 adjusts the amount of data received from the IP network 40 (see FIG. 1). In this case, for example, the priority of the transmission of each logical channel is changed by MAC control information.

As a result, the transmission rate of the data transmitted from the eNB side to the UE side is reduced, and it is possible to prevent data from overflowing the buffer 123a and disappearing.

In FIGS. 8 to 10, the amount of data accumulated in the buffer 123a arranged in the PDCP entity 123 on the UE side is monitored. Alternatively, the amount of data accumulated in the buffer 122a arranged on the PLC entity 122 may be monitored.

According to the embodiments, an overflow of data from the buffer receiving the data due to the throughput of a connection destination does not occur, so that missing of data can be suppressed.

What is claimed is:

1. A wireless communication device comprising:
   a wireless communication section that wirelessly communicates with another wireless communication device;
   a first data processing section that obtains data received in the wireless communication section from the another wireless communication device, separates the data into pieces of the data for respective logical channels, and distributes the pieces of data to the logical channels respectively; and
   a plurality of second data processing sections that are assigned to the logical channels respectively, receive the pieces of data for the logical channels from the first data processing section, and process the received pieces of data, each of the plurality of second data processing sections further comprising:
      a buffer that temporarily accumulates data to which the second data processing section applies a process;
      a buffer monitoring section that monitors an amount of data accumulated in the buffer and detects that the amount of data is exceeded a predetermined threshold; and
      a control information generating section that generates, in response to detecting in the buffer monitoring, data-amount control information for instructing a reduction in a data transmission rate of the corresponding logical channel, and transmits the generated data-amount control information toward the another wireless communication device through the wireless communication section.

2. The wireless communication device according to claim 1, wherein each of the plurality of second data processing sections comprises:
a first sub-processing section that obtains encrypted piece of data for the logical channel from the first data processing section when the received data is encrypted and requests retransmission of a lack of pieces of data; and
a second sub-processing section that obtains the encrypted data from the first sub-processing section and decodes the encrypted piece of data,
wherein the buffer, the buffer monitoring section, and the control information generating section are arranged in the second sub-processing section.

3. The wireless communication device according to claim 2, wherein the wireless communication section is arranged on a physical layer,
the first data processing section is arranged on a MAC (Medium Access Control) sublayer, and
the first sub-processing section and the second sub-processing section in the second data processing section are arranged on an RLC (Radio Link Control) sublayer and a PDCP (Packet Data Convergence Protocol) sublayer, respectively.

4. The wireless communication device according to claim 1, wherein each of the plurality of second data processing sections comprises:
a first sub-processing section that obtains encrypted piece of data for the logical channel from the first data processing section when the received data is encrypted and requests retransmission of a lack of pieces of data; and
a second sub-processing section that obtains the encrypted data from the first sub-processing section and decodes the encrypted piece of data,
wherein the buffer and the buffer monitoring section are arranged in the second sub-processing section while the control information generating section is arranged in the first sub-processing section.

5. The wireless communication device according to claim 4, wherein the wireless communication section is arranged on a physical layer,
the first data processing section is arranged on a MAC (Medium Access Control) sublayer, and
the first sub-processing section and the second sub-processing section in the second data processing section are arranged on an RLC (Radio Link Control) sublayer and a PDCP (Packet Data Convergence Protocol) sublayer, respectively.

6. The wireless communication device according to claim 1, wherein each of the plurality of second data processing sections comprises:
a first sub-processing section that receives data for the logical channel from the first data processing section and instructs retransmission of a lack of data; and
a second sub-processing section that receives data from the first sub-processing section and decodes encrypted data,
wherein the buffer, the buffer monitoring section, and the control information generating section are arranged in the first sub-processing section.

7. The wireless communication device according to claim 6, wherein the wireless communication section is arranged on a physical layer,
the first data processing section is arranged on a MAC (Medium Access Control) sublayer, and
the first sub-processing section and the second sub-processing section in the second data processing section are arranged on an RLC (Radio Link Control) sublayer and a PDCP (Packet Data Convergence Protocol) sublayer, respectively.

8. The wireless communication device according to claim 1, wherein instead of each of the plurality of second data processing sections comprising the control data generating section, the first data processing section comprises:
a control information generating section that generates, in response to detecting in the buffer amount monitoring section, data-amount control information for instructing a reduction in the data transmission rate of the logical channel, and transmits the generated data-amount control information toward the another wireless communication device through the wireless communication section.

9. A wireless communication program storage medium, which stores a wireless communication program, that causes a computer to function as a wireless communication device that is wirelessly connectable to a network, the program comprising the steps of:
communicating wirelessly with another wireless communication device;
obtaining data received from the another wireless communication device, separating the obtained data into pieces of data for respective logical channels, and distributing the pieces of data to the logical channels, respectively; and
processing the distributed pieces of data and comprising, for each of the logical channels, the steps of:
temporarily accumulating the piece of data to be processed for each of the logical channels;
monitoring the buffer to detect that an amount of the piece of data accumulated in the buffer exceeds a predetermined threshold; and
generating, in response to detecting in the step of monitoring the buffer, data-amount control information for instructing a reduction in a data transmission rate of the corresponding logical channel and transmitting the generated data-amount control information toward the another wireless communication device through wireless communication.

10. A wireless communication method for causing a wireless communication device connectable to a network to perform wireless communication via a base station, the wireless communication method comprising the steps of:
communicating wirelessly with another wireless communication device;
obtaining data received from the another wireless communication device, separating the obtained data into pieces of data for respective logical channels, and distributing the pieces of data to the logical channels, respectively; and
processing the distributed pieces of data and comprising, for each of the logical channels, the steps of:
temporarily accumulating the piece of data to be processed for each of the logical channels;
monitoring the buffer to detect that an amount of the piece of data accumulated in the buffer exceeds a predetermined threshold; and
generating, in response to detecting in the step of monitoring the buffer, data-amount control information for instructing a reduction in a data transmission rate of the corresponding logical channel and transmitting the generated data-amount control information toward the another wireless communication device through wireless communication.

* * * * *